United States Patent [19]

Kos et al.

[11] 4,149,197

[45] Apr. 10, 1979

[54] DIRECT IMAGING APPARATUS FOR AN ELECTRONIC DOCUMENT TRANSMITTER UTILIZING A LINEAR ARRAY OF PHOTO-DETECTORS

[75] Inventors: Steven Kos; David R. Baraff, both of Ottawa, Canada

[73] Assignee: Northern Telecom Limited, Montreal, Canada

[21] Appl. No.: 840,648

[22] Filed: Oct. 11, 1977

[51] Int. Cl.² .................................... H04N 1/04
[52] U.S. Cl. .................................... 358/294
[58] Field of Search ............... 358/212, 213, 294, 285

[56] References Cited
U.S. PATENT DOCUMENTS
3,544,713  12/1970  Case et al. .................... 358/294

OTHER PUBLICATIONS

IBM Technical Disclosure Bulletin, vol. 15, No. 1, Jun. 1972.

*Primary Examiner*—Robert L. Richardson
*Attorney, Agent, or Firm*—Sidney T. Jelly

[57] ABSTRACT

Instead of imaging a line across a document by a lens system on to an imager, direct imaging is obtained by positioning the document in close proximity to but spaced a predetermined distance from a linear array of photo-detectors and illuminating the document by light from beneath the detectors, the light passing through spaces between detectors and being reflected back to the detectors. To prevent saturation of the dectectors by light direct from the illuminating means, opaque material is positioned beneath the detectors with gaps or apertures through which light can illuminate the document. The detectors can be spaced close together to give desired resolution, or spaced a predetermined distance apart and the detector head stepped laterally. More than one line of detectors can be provided.

7 Claims, 5 Drawing Figures

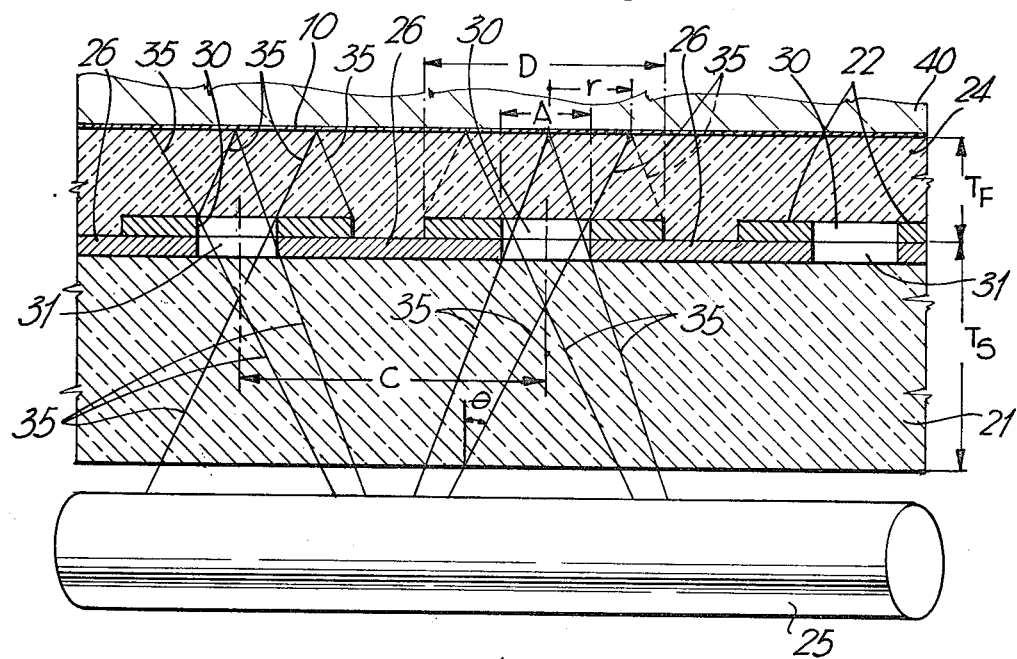
-Fig-3-
-Fig-4-
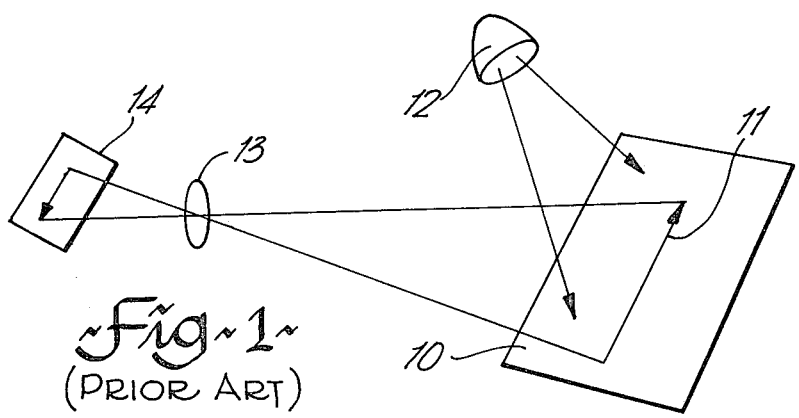
-Fig-1-
(PRIOR ART)

DIRECT IMAGING APPARATUS FOR AN ELECTRONIC DOCUMENT TRANSMITTER UTILIZING A LINEAR ARRAY OF PHOTO-DETECTORS

This invention relates to direct imaging apparatus for electronic transmitter for documents and the like, such as for facsimile transmitting systems.

In conventional imaging apparatus, an imaging of the object, usually a line across a page, is obtained by a lens system. Such a system is large, it being necessary to provide the necessary light path length for the lens system. The object — the document being copied is some distance from the imaging device.

The present invention provides for positioning the imaging device — the detector array — in close proximity to the document. This requires a completely different arrangement for illuminating the document. For a transparency it would be satisfactory to illuminate the document from the back, that is from the side remote from the detector or imaging device. However, for normal paper documents, the paper is so opaque that the transmitted light level is too low to give an acceptable signal from the detector. Also such a way of lighting would prevent, or at least make very difficult, copying a page of a book or similar document, particularly if printed on both sides.

With the present invention, light is passed through the detector array onto the document, the light then reflected from white, or light coloured, areas on to the detectors of the array. To prevent saturation of the detectors, opaque areas are provided beneath detector elements, with gaps between elements and associated opaque areas for light to pass through to the document.

The invention will be readily understood by the following description, in conjunction with the accompanying drawings, in which:

FIG. 1 is a diagrammatic illustration of a conventional form of apparatus;

FIG. 3 is a diagrammatic cross-section through one form of apparatus in accordance with the present invention;

FIG. 4 is a diagrammatic cross-section, similar to that of FIG. 3, illustrating the relevant dimensions;

Figure 2:
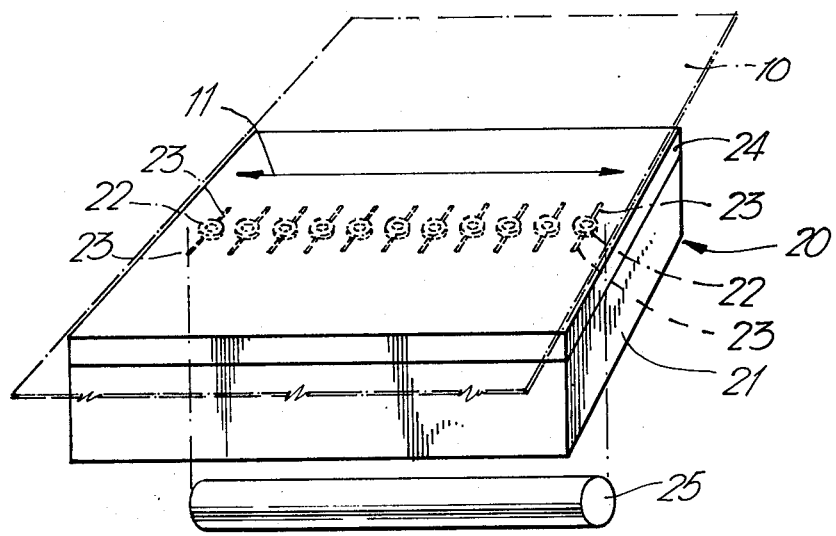
FIG. 2 is a diagrammatic illustration of a form of apparatus in accordance with the present invention, in perspective.

FIG. 1 illustrates the basic arrangement of many conventional forms of images, or scanners. The document is indicated at 10, the arrow 11 indicating an object on the document, for example the line of print. The document is illuminated by a light source 12 and light reflected from the object is focussed by a lens system 13 onto an imager 14. One form of imager is a charge-coupled device (CCD) array. The arrangement of FIG. 1 is quite bulky as the light path between object 11 and the imager 14 has a certain minimum to enable an acceptable lens system to be used.

FIG. 2 illustrates the basic arrangement of the present invention. The document 10, indicated in chain dotted outline, is positioned on a detector head 20 which is composed of a transparent substrate 21 on which are formed the detector elements 22. Electrical connections to the detector elements are indicated at 23. Over the substrate 21 and elements 22 is placed a transparent spacer 24. A source of illumination is indicated at 25. The object is indicated by the arrow 11, as in FIG. 1.

The apparatus of FIG. 2 is seen in cross-section in FIG. 3, and in more detail in cross-section in FIG. 4. To prevent saturation of the detector elements 22 by the direct light from light source 25, through the substrate 21, opaque material 26 is positioned beneath the elements 22.

In the example illustrated in FIGS. 3 and 4 the elements 22 are annular and apertures or gaps 31 are formed in the opaque material 26 coincident with the central aperture 30 in each element 22.

The relevant geometry of the apparatus is illustrated in FIG. 4. The substrate thickness is Ts; the separation distance between document 10 and the photoconductor elements 22, which is substantially the same as the thickness of the transparent spacer 24, is TF; the centre spacing between detector elements is C; the detector diameter is D; and the light aperture is A. For simplicity it is assumed that the lamp is an isotropic source and the document is an isotropic reflector. The angle of total internal reflection is $\theta$ and is near 40° for glass. No light falls on the document for r — the sideways displacement from the aperture centre — greater than A/2 + 0.84 TF; (0.84=tan 40°). Illumination within this area is substantially constant. Because the entrance angle within the glass is 40° maximum, light cannot spill from the endmost illuminated point beyond a distance A/2 + (0.84 TF) × 2 in the detecting plane. If a resolution of 200 lines per inch is required, [A/2 + (0.84 TF) × 2] ≦ 0.005″, that is $$A + 3.36\, TF \leq 0.005. \text{ If } TF < 0.001,$$

$$A \leq 0.001.64.$$

In practice the dimensions for A and TF could be slightly larger as the light intensity near the edges and at high angles is over estimated in the approximation. In practice A and TF would be optimized to take problems of manufacture and sensitivity into account. Various light ray paths are indicated by lines 35 in FIG. 4. If, as is likely, the opacity of the opaque material varies with thickness, a certain amount of light will pass through the corners of the opaque material, as indicated at 36.

In FIGS. 3 and 4, the opaque material 26 is shown as being in the transparent substrate. This can be done, for example, by photolithographically etching the substrate and then depositing suitable opaque material in the etched holes. The elements 22 can be formed by conventional thin film techniques. Alternatively, it would be possible to deposit the opaque material on top of the substrate, either through a mask or by forming a continuous strip and then photolithographically etching to form the desired pattern. The elements 22 would then be formed on top of the opaque material. The transparent spacer 24 can be formed by depositing a suitable material over the elements 22, for example a silica glass. A cover is indicated at 40.

Figure 5:
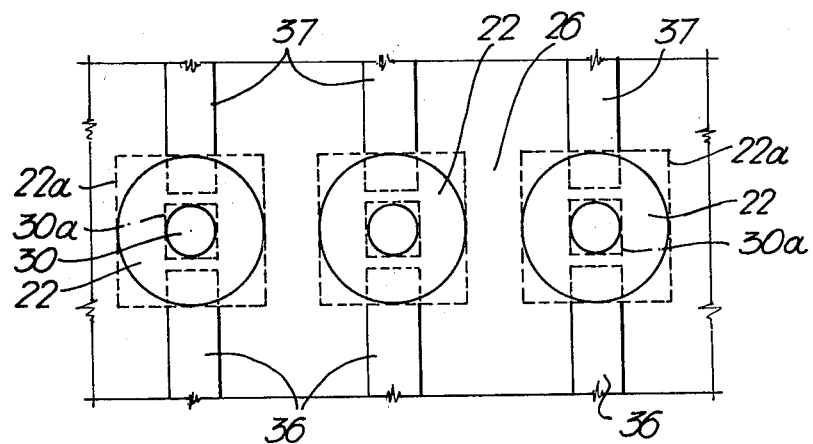
FIG. 5 is a plan view of part of an imaging apparatus, as in FIGS. 3 and 4.

FIG. 5 illustrates one arrangement of electrical connections to the detector elements 22. Conductors 36 extend from one side of the elements and conductors 37 extend from the other side. The conductors 36 and 37, in the example illustrated, are formed on the substrate 21, extending over the opaque material 26. The inner ends 38 of the conductors extend under the elements and are in electrical contact therewith.

The conductors 36 and 37 can be connected in a matrix formation to provide for selective connection of the elements to a detector circuit.

In FIGS. 4 and 5, the detector elements 22 are annular, being of circular form with circular apertures 30 in the detectors and similar apertures 31 in the opaque material 27. An alternative is for the detectors to be rectangular, for example square, as indicated by dotted lines 22a in FIG. 5, with rectangular, that is square, apertures — as indicated by dotted lines 30a — in the detectors with similar apertures in the opaque material.

The particular form of light, that is wavelength (or mixtures of wavelengths) may very, the light being such as will be reflected efficiently by the document. The substrate will be transparent to such light and the opaque material opaque to such light.

The detector elements 22 can be spaced close enough together to provide the desired resolution, or spaced a predetermined number of units apart with lateral stepping of the head. In another arrangement, a plurality of lines of detector elements can be provided, the detectors in a staggered relationship, to give close overall spacing of detector elements.

What is claimed is:

1. A direct imaging apparatus for an electronic reader of documents, comprising:
    a transparent substrate;
    a plurality of photo-detectors on a top surface of said substrate, said photo-detectors spaced apart in a linear array;
    spacer means on said top surface of said substrate to position a document a predetermined distance from said photo-detectors;
    illuminating means below said substrate for illuminating said document through apertures in said linear array;
    opaque means between said photo-detectors and said illuminating means to prevent direct impingement of light from said illuminating means on to said photo-detectors;
    contact means connected to each photo-detector for abstraction of signals indicative of light reflected from said document impinging on said photo-detectors.

2. Apparatus as claimed in claim 1, said opaque means comprising a layer of opaque material at said top surface of said substrate.

3. Apparatus as claimed in claim 1, said opaque layer formed in said top surface of said substrate.

4. Apparatus as claimed in claim 1, said spacer means comprising a layer of transparent material on said top surface of said substrate, over said photo-detectors.

5. Apparatus as claimed in claim 1, said photo-detectors each of annular form having a central aperture, said opaque means comprising a layer of opaque material at the top surface of said substrate extending for the extent of said linear array and at least as wide as the diameter of said photo-detectors, and apertures through said layer of opaque material aligned with the apertures in said annular photo-detectors.

6. Apparatus as claimed in claim 5, said photo-detectors of rectangular plan form and having rectangular apertures therein.

7. Apparatus as claimed in claim 5, said photo-detectors of circular plan form and having circular apertures therein.

* * * * *

REEXAMINATION CERTIFICATE (1174th)
United States Patent [19]
Kos et al.

[11] B1 4,149,197
[45] Certificate Issued  Dec. 19, 1989

[54] DIRECT IMAGING APPARATUS FOR AN ELECTRONIC DOCUMENT TRANSMITTER UTILIZING A LINEAR ARRAY OF PHOTO-DETECTORS

[75] Inventors: Steven Kos; David R. Baraff, both of Ottawa, Canada

[73] Assignee: Bell-Northern Research Ltd., Ottawa, Canada

Reexamination Request:
No. 90/001,513, May 18, 1988

Reexamination Certificate for:
Patent No.: 4,149,197
Issued: Apr. 10, 1979
Appl. No.: 840,648
Filed: Oct. 11, 1977

[51] Int. Cl.⁴ .............................................. H04N 1/04
[52] U.S. Cl. ................................ 358/471; 250/578; 358/482
[58] Field of Search .................. 358/213.11, 213.13, 358/212, 285, 293, 294

Primary Examiner—Robert L. Richardson

[57] ABSTRACT

Instead of imaging a line across a document by a lens system on to an imager, direct imaging is obtained by positioning the document in close proximity to but spaced a predetermined distance from a linear array of photo-detectors and illuminating the document by light from beneath the detectors, the light passing through spaces between detectors and being reflected back to the detectors. To prevent saturation of the dectectors by light direct from the illuminating means, opaque material is positioned beneath the detectors with gaps or apertures through which light can illuminate the document. The detectors can be spaced close together to give desired resolution, or spaced a predetermined distance apart and the detector head stepped laterally. More than one line of detectors can be provided.

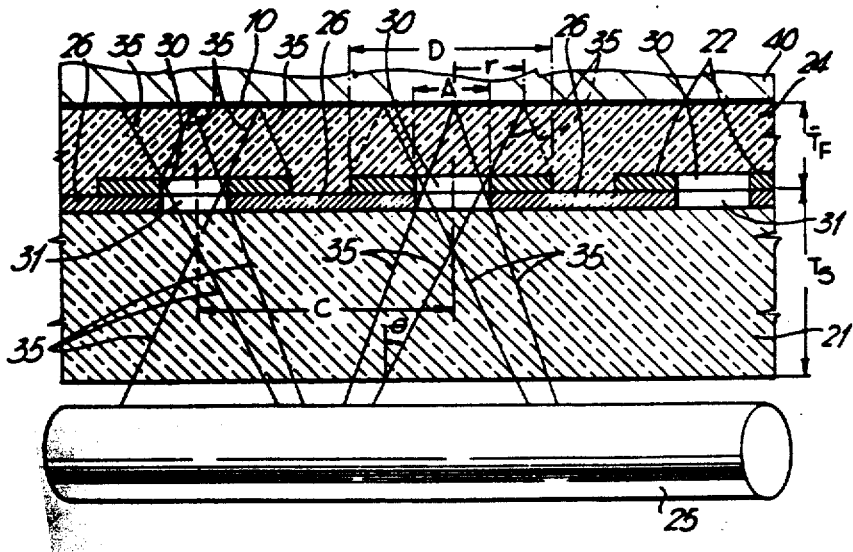

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *